United States Patent [19]
Webster et al.

[11] Patent Number: 5,567,527
[45] Date of Patent: Oct. 22, 1996

[54] COPOLYMERS CONTAINING 1,3-DIOXOLANE-2-ONE-4-YL GROUPS AND COATINGS MADE THEREFROM

[75] Inventors: Dean C. Webster, Kingsport; Chih-Herng J. Su, deceased, late of Kingsport, by Yann-Fen Su, executrix; Charles H. Foster, Kingsport, all of Tenn.

[73] Assignee: Eastman Chemical Company, Kingsport, Tenn.

[21] Appl. No.: 395,392

[22] Filed: Feb. 21, 1995

[51] Int. Cl.$^6$ .................. C09D 137/00; C09D 175/12; C08L 75/12; C08L 37/00
[52] U.S. Cl. .................. 428/412; 428/423.1; 427/385.5; 525/327.2; 526/269
[58] Field of Search .................. 525/327.2; 526/269; 428/412, 423.1; 427/385.5

[56] References Cited

U.S. PATENT DOCUMENTS

| | | | |
|---|---|---|---|
| 4,263,418 | 4/1981 | Steffen et al. | 525/277 |
| 4,772,666 | 9/1988 | Just et al. | 525/185 |
| 5,045,602 | 9/1991 | Wamprecht | 525/327.2 |
| 5,374,699 | 12/1994 | Iwamura et al. | 526/269 |

FOREIGN PATENT DOCUMENTS

| | | |
|---|---|---|
| 62-022375 | 1/1987 | Japan . |
| 62-254303 | 11/1987 | Japan . |

OTHER PUBLICATIONS

Bissinger, et al., J. Am. Chem. Soc., 69, 2955–2961.

Seisan Kenkyu, 25 (7) 297–299 (1973).

*Primary Examiner*—David Buttner
*Attorney, Agent, or Firm*—Bernard J. Graves, Jr.; Harry J. Gwinnell

[57] ABSTRACT

Provided are curable copolymers having 1,3-dioxolan-2-one-4-yl groups incorporated therein. The copolymers are useful as binders in coating compositions and can be cured with primary amine cross-linking compounds to form a continuous polyurethane coating.

42 Claims, No Drawings

COPOLYMERS CONTAINING 1,3-DIOXOLANE-2-ONE-4-YL GROUPS AND COATINGS MADE THEREFROM

FIELD OF THE INVENTION

This invention belongs to the field of coating chemistry. In particular, this invention relates to curable polymers having 1,3-dioxolan-2-one-4-yl-groups copolymerized therein which are useful in coating compositions and can be crosslinked with multifunctional amines.

BACKGROUND OF THE INVENTION

Polymer crosslinking agents or "crosslinkers" are multifunctional molecules capable of reacting with pendant functional groups on polymers. The use of crosslinkers enables one to increase the molecular weight of the polymer, usually in a second step, and thus improves the properties of the resulting polymer or polymeric film. Most crosslinking reactions are initiated by heating a mixture of the polymer and the crosslinker either neat or in a solvent. Such systems are often referred to as "thermosetting" systems.

Crosslinkers are particularly useful in coating applications due to the fact that the crosslinker enables the use of relatively low molecular weight polymers and resins which are easily handled in solvents. The formulation can subsequently be applied to the substrate and heated, or cured, to give the finished (thermoset) coating. This makes it possible to take advantage of the ease of handling and solubility characteristics of the lower molecular weight resins used in the formulation and subsequently develop the hardness, chemical and solvent resistance, as well as strength/flexibility properties desired in the ultimate coating by the reaction of the crosslinker with the resin during the curing process.

Crosslinkers are becoming increasingly important due to the emphasis on more environmentally acceptable coatings. One major environmental concern in the coatings industry is the amount of organic solvent released during the curing process. This solvent level or Volatile Organic Content (VOC) is of concern due to the role of organic solvents in the development of photochemical smog. For these reasons various governments, including the U.S., are regulating the VOC levels of coating formulations. One way to reduce the amount of solvent necessary in a coating formulation is to reduce the molecular weight of the resin backbone used in the formulation. When this approach is used, however, crosslinking becomes even more critical to the development of the ultimate properties in the cured film. Thus, in these applications the crosslinker enables a more environmentally sound coating formulation.

Properties of Crosslinked Films and Coatings:

A number of properties are desired in a coating in order to impart the desired protection of the object from corrosion and other environmental factors. Some of the protective characteristics that are ultimately desired include the resistance of the coating to various chemicals and solvents, the impact strength of the system, the hardness of the coating and the weather-ability, or resistance of the system to various factors related to environmental exposure.

I) Chemical and Solvent Resistance

In order for a coating to impart adequate protection to the object coated it must be resistant to various chemicals and solvents. If a coating is not resistant to solvents and chemicals, the coating could be removed or the protective integrity compromised by exposure to commonly used materials such as cleaners or gasoline. Since the coating formulation is usually applied in a solvent, development of solvent resistance in the cured film indicates a change in the chemical nature of the coating formulation. This change can be attributed to the crosslinking of the polymer. A commonly used test to assay this property is the methyl ethyl ketone (MEK) rub resistance of the coating. The MEK rub resistance of a coating is often a good diagnostic test for determining the extent of cross-linking in coatings. For most applications, a MEK rub resistance of greater than 175–200 is generally desired.

II) Impact Strength

In order for a coating to be resistant to collisions and other sudden impacts the material must have certain strength characteristics. If a coating does not possess enough strength, impacts and/or collisions will lead to chipping and breaking of the coating which, in turn, compromises the protective integrity of the film. A commonly used test for the impact strength of a coating (ASTM D2794-84) is to drop a weight from various heights on a coated panel and determine the force(in inch-lbs.) required to break the coating. Proper crosslinking can help develop the impact strength of a coating.

III) Hardness

In order for a coating to be resistant to scratching and other such abrasions the coating must possess a certain degree of hardness. This resistance to scratching is often determined by marring the coating with pencils of various hardness and noting which hardness of pencil actually scratches the coating.

Hardness and impact strength often work in opposite directions. This is due to the fact that impact strength reflects both the strength and the flexibility of the polymeric film, while hardness reflects primarily just the strength or rigidity of the film. Thus one often seeks a combination of hardness and flexibility by compensating one of the above characteristics for the other.

The compensation of these two factors is best understood by invoking the theory of crosslink density. If the coating formulation consists of a group of poly-functional (n>2) polymer molecules and crosslinker then the crosslinking process can be thought of as consisting of a series of steps. Initially, the crosslinking reaction consists of intermolecular reactions of various polymer chains. During the initial phase the polymer and crosslinker chains are combining and thus building in molecular weight, but, the mobility of the resulting polymer chains is not greatly restricted. This stage would be characterized by improvement in the chemical resistance, hardness and impact strength of the film. At some point, however, intermolecular reaction is essentially complete and intramolecular reaction becomes significant. At this point, the polymer becomes more rigid due to restriction of the polymer chain mobility by these intramolecular reactions and the resulting coating becomes more brittle. At this stage hardness will improve but the impact strength will decrease, due to the increased rigidity of the polymer network. The balance between flexibility and hardness can be controlled by the amount of crosslinker used, the average functionality of the polymer and crosslinker as well as the chemical structure of the polymer or crosslinker.

IV) Resistance to Atmospheric Exposure (Weathering)

Since many coated objects are exposed to severe weather conditions the performance of the coating under various exposure conditions is very important. Factors which affect the weatherability of the coating include the composition of the polymer and the crosslinker, as well as the degree of crosslinking. A variety of exposure tests are available which enable one to determine the performance of the system to severe conditions.

Crosslinkers Currently Used in the Field:

A large number of crosslinkers are used in various applications. A partial list of the more commonly used functional groups used in crosslinkers include:

Epoxy Compounds

Isocyanates

Amino resins

Unsaturated compounds

These materials take advantage of the reaction of the aforementioned functional groups with various pendant groups on the polymeric backbone. These crosslinkers can be used in combination with other crosslinkers to impart a variety of desired characteristics to the coatings. The use and reactions of these crosslinkers have been reviewed elsewhere. (See, for example, Labana, S. S., in "*Encyclopedia of Polymer Science and Engineering*", Vol. 4, pp. 350–395.

We have found that 4-ethenyl-1,3-dioxolan-2-one can be copolymerized under solution and emulsion free-radical polymerization conditions with a variety of ethylenically unsaturated monomers to yield cyclic carbonate functional copolymers. These copolymers can be crosslinked with primary amine functional materials to form crosslinked coatings curable under air-drying and force drying conditions. The resulting coatings contain urethane crosslinks, but have been formed without the use of polyfunctional isocyanates.

The homopolymerization of vinyl ethylene carbonate results in a low conversion of monomer to polymer, usually less than 50 percent. Bissinger, et al., *J. Am. Chem. Soc.*, 69, 2955–2961, describe the preparation and homopolymerization of vinyl ethylene carbonate. U.S. Pat. No. 2,511,942 also describes the preparation and homopolymerization of vinyl ethylene carbonate. *Seisan-kenkyu*, 25(7), 297–299 (1973) describes the polymerization of vinyl ethylene carbonate and subsequent reaction of the homopolymer with butyl amine. JP 62022375 and 62254303 describe the use of the homopolymer of vinyl ethylene carbonate as an electrolyte for lithium batteries.

*Seisan-kenkyu*, 25(7), 297–299 (1973) also describes the copolymerization of vinyl ethylene carbonate with various polymerizable comonomers and the reaction of a copolymer with styrene with ethylenediamine. U.S. Pat. No. 4,263,418 describes graft copolymers containing vinyl ethylene carbonate as one of the co-monomers used. JP 62254303 and 62022375 also describe the use of copolymers of vinyl ethylene carbonate for use as battery electrolytes.

U.S. Pat. No. 4,772,666 describes the use of polymers containing carbonate and other functional groups in a resin which is crosslinked with either isocyanates or melamine resins to form a coating.

SUMMARY OF THE INVENTION

This invention provides copolymers of ethylenically unsaturated monomers, in particular, copolymers of vinyl ethylene carbonate with other unsaturated monomers. The copolymer may be prepared in either solution or emulsion. The copolymers are useful in two-component cross-linked or thermosetting organic coatings, in particular, for such applications as automotive paints, maintenance coatings, and product finishes.

The primary film former is the carbonate functional copolymer which can be crosslinked with a multi-functional primary amine functional material. The crosslinked coatings exhibit superior performance over their uncrosslinked analogs.

DETAILED DESCRIPTION OF THE INVENTION

The present invention provides carbonate functional copolymers which are formed from the free-radical copolymerization of 4-ethenyl-1,3-dioxolan-2-one (vinyl ethylene carbonate, (VEC)

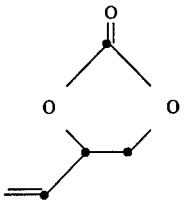

with other ethylenically unsaturated monomers. The carbonate functional copolymers can then be crosslinked with multifunctional primary amines at ambient or low-bake (80° C.) temperature. The above curable polymers can be prepared, as will be shown below, by either emulsion or solution polymerization techniques.

Thus, the present invention provides a method for forming a polyurethane coating on a substrate which comprises applying to said substrate a coating composition which comprises (a) a curable acrylic copolymer prepared by the free radical polymerization of from about 1 to 50 weight percent, based on the total weight of monomers, of a monomer compound of formula (I)

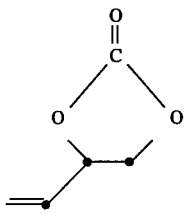

(I)

and one or more monoethylenically unsaturated monomers of a structure other than formula (I), and (b) an amino-functional crosslinking agent.

As a further aspect of the present invention, there is provided a coating composition which comprises (a) a curable acrylic copolymer prepared by the free radical polymerization of from about 1 to 50 weight percent, based on the total weight of monomers, of a monomer compound of formula (I)

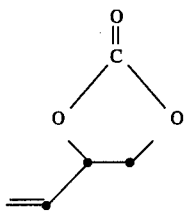

(I)

and one or more monoethylenically unsaturated monomers of a structure other than formula (I), and (b) an amino-functional crosslinking agent, with the proviso that said agent is other than methylenediamine, ethylenediamine, or hexylenediamine.

Allyl-type monomers are known to be sluggish towards free radical polymerization and usually require high temperature or pressure in order to form a copolymer at high yield. (C. E. Schildknecht, "Allyl Compounds and their Polymers", Wiley & Sons, 1973.)

Therefore, it is surprising that VEC would copolymerize with ethylenically unsaturated monomers in as high yields as has been achieved herein. Also, sufficient amounts of the VEC have been incorporated into the copolymer to allow for subsequent crosslinking. We have found that VEC copolymerizes with a variety of unsaturated monomers under both solution polymerization and emulsion polymerization processes.

This invention also provides for the preparation of crosslinked materials by the reaction of the cyclic carbonate functional copolymer with a polyfunctional primary amine containing material.

Preferred amine functional crosslinking materials include the following: diethylene triamine, ethane-diamine, tris(2-aminoethyl)amine, 4-aminomethyl-1,8-octane diamine, menthane diamine, and primary amine end-capped polyethylene glycol polymers sold under the trade mark JEFFAMINE, and the like. In general, such cross-linkers will preferably have the structure $R(NH_2)_n$, wherein R is a $C_2-C_{12}$ hydrocarbyl radical or polymer and n is an integer of from 2 to about 6.

This invention also provides a way to prepare crosslinked coatings containing urethane groups without the use of isocyanates. Polyurethane coatings are well known and highly valued due to their high durability, hardness, flexibility, and adhesion.

However, polyurethane coatings are usually prepared by the reaction of a polyfunctional oligomeric polyol with a polyfunctional isocyanate. Polyfunctional isocyanates are undesirable materials due to their toxicological properties. The amine-cyclic carbonate reaction thus provides a highly desirable urethane crosslink without the use of isocyanates.

The solution copolymers can be prepared by charging the monomers, solvent, and initiator to a reaction vessel and heating to the desired temperature, then holding the reaction at that temperature until the polymerization is complete.

A preferred process is known in the industry as the "starved-feed" process where a mixture of the monomers and the initiator is fed into the preheated solvent over a period of time. This process is reported to result in better compositional control of the copolymers since a high conversion of monomer to polymer is maintained in the reaction vessel. This process also results in better temperature control of the polymerization. The addition rate and process temperature is optimized for the initiator used.

We have found that it is preferable to charge VEC into the reaction vessel with the solvent, rather than mixing it with the other monomers. This results in better conversion of monomer to polymer and higher incorporation of VEC in the copolymer. Thus, as a further aspect of the present invention, there is provided a process for preparing a copolymer about 1 to 70 weight percent of which is derived from vinyl ethylene carbonate, which comprises:

(a) dissolving vinyl ethylene carbonate in an organic solvent to form a solution;

(b) heating said solution to about 60 to about 130° C.; followed by (c) adding to said solution, one or more mono-ethylenically unsaturated monomers, said monomers being other than vinyl ethylene carbonate, along with a free radical initiator.

We have also found that choice of comonomer is important in achieving good monomer conversion and higher levels of incorporation of VEC into the copolymer. Vinyl esters result in better incorporation of VEC, followed by acrylates, methacrylates, and styrene.

Preferred mono-ethylenically unsaturated monomers which can be used for copolymerization with vinyl ethylene carbonate in this invention include the following:

(i) acrylic, methacrylic, crotonic, or other unsaturated acids or their esters such as methyl methacrylate, ethyl acrylate, butyl acrylate, propyl acrylate, butyl methacrylate, 2-ethyl hexyl acrylate, dimethyl amino ethyl methacrylate, hydroxy ethyl methacrylate, glycidyl methacrylate, and the like;

(ii) styrene-type monomers such as styrene, alpha-methyl styrene, vinyl toluene, and the like;

(iii) vinyl compounds such as vinyl chloride, vinyl acetate, vinyl proprionate, vinyl 2-ethyl hexanoate, vinyl pivalate, and the like;

(iv) allyl compounds such as allyl alcohol, allyl chloride, allyl acetate, and the like;

(v) other copolymerizable unsaturated monomers such as dimethyl maleate, maleic anhydride, dimethyl itaconate, acrylonitrile, acrylamide, isoprene, butadiene, and the like.

Especially preferred unsaturated monomers include acetoacetoxyethyl methacrylate, t-butylaminoethyl methacrylate, dimethylaminoethyl methacrylate, methyl acrylate, methyl methacrylate, ethyl acrylate, ethyl methacrylate, butyl acrylate, butyl methacrylate, isobutyl acrylate, isobutyl methacrylate, ethylhexyl acrylate, ethylhexyl methacrylate, octyl acrylate, styrene, α-methyl styrene, vinyl acetate, di-n-butyl maleate, divinyl benzene, ethylene glycol diacrylate, ethylene glycol dimethacrylate, trimthylolpropane triacrylate, trimethylolpropane trimethacrylate, hexanediol diacrylate, hexanediol dimthacrylate, and compounds of the formula

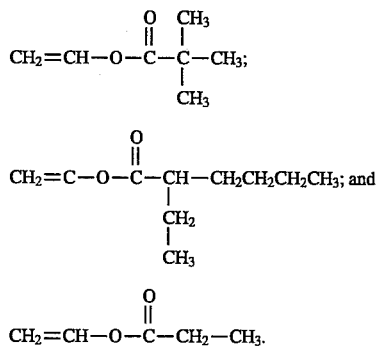

The choice of the free radical initiator is important in order to provide a resin solution with low color. The polymerizations can be initiated by conventional free radical initiators such as benzoyl peroxide, di-t-butyl peroxide, t-butyl peroctoate, t-amyl-peroxy-2-ethyl hexanoate, hydrogen peroxide, potassium or ammonium peroxydisulfate, dibenzoyl peroxide, lauryl peroxide, 2,2'-azobisisobutyronitrile, t-butylperoxide, t-butyl hydroperoxide, sodium formaldehyde sulfoxylate and the like. Redox initiator systems can include persulfate/metabisulfite, hydrogen peroxide/$Fe^+$+/persulfate/bisulfite/(iso) ascorbic acid, hydrogen peroxide/$Fe^{++}$/sodium formaldehyde sulfoxolate, etc.

The solution polymerizations can be carried out in a solvent appropriate for the end-use and polymerization conditions. Typical solvents can include xylene, toluene, methyl amyl ketone, ethyl ethoxy proprionate, ethylene glycol butyl ether, and the like.

Upon completion of the solution polymerization, it is preferred that any unreacted VEC be removed as a vapor. This can be accomplished under reduced pressure with or without the application of heat. Thus, as a further aspect of the present invention, there is provided the above process further comprising the step:

(d) removing unreacted vinyl ethylene carbonate as a vapor under reduced pressure.

In general, the emulsion polymerization of VEC can be carried out according to standard emulsion polymerizaion procedures as practiced in the industry. Surfactants used can be either ionic or non-ionic types. Suitable surfactants include ionic an nonionic surfactants such as alkyl polyglycol ethers such as ethoxylation products of lauryl, oleyl, and stearyl alcohols; alkyl phenol polyglycol ethers such as ethoxylation products of octyl- or nonylphenol, diisopropyl phenol, triisopropyl phenol; alkali metal ammonium salts of alkyl, aryl or alkylaryl sulfonates, sulfates, phosphates, and the like, including sodium lauryl sulfate, sodium octylphenol glycolether sulfate, sodium dodecylbenzene sulfonate, sodium lauryldiglycol sulfate, and ammonium tritertiarybutyl phenol and penta- and octa-glycol sulfonates, sulfosuccinate salts such as disodium ethoxylated nonylphenol half ester of sulfosuccinic acid, disodium n-octyldecyl sulfosuccinate, sodium dioctyl sulfosuccinate, and the like.

Also, reactive anionic or nonionic surfactants possessing styrene or allyl groups may be utilized. Examples include surface active monomers sold by PPG Industries, Inc., as SAM 181, 183, 184, 211 which are anionic sulfates or sulfonates and SAM 185–187 which are nonionic. Other reactive surfactants include those sold by Daiichi Kogyo Seiyaku under the name AQUARON. Examples of AQUARON surfactants includes compounds of the formulae

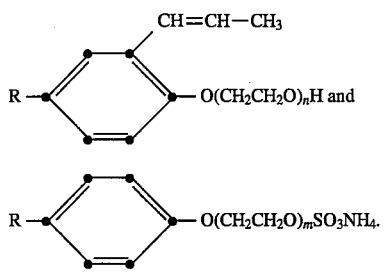

(See Japanese Kokai 4-40204 and Kokai 4-53802.) Other reactive surfactants include the sodium alkyl allyl sulfosuccinate sold by Henkel, under the name TREMLF-40. Further examples of such surfactants can be found in U.S. Pat. Nos. 5,185,212; 2,600,831; 2,271,622; 2,271,623; 2,275,727; 2,787,604; 2,816,920; and 2,739,891, incorporated herein by reference. Stabilizers can be water dispersible polyesters.

Thus, as a further aspect of the present invention, there is provided a curable emulsion polymer comprising water and a curable acrylic copolymer prepared by the free radical polymerization of from about 1 to 50 weight percent, based on the total weight of monomers, of a monomer compound of formula (I)

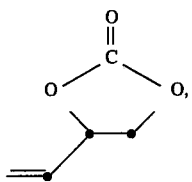

(I)

and one or more monoethylenically unsaturated monomers of a structure other than formula (I).

EXPERIMENTAL SECTION

EXAMPLE 1

Preparation of Solution Acrylic Resin

In a typical polymerization to form a VEC containing copolymer, 266.6 g xylene and 100 g VEC are charged to a 1 liter two-piece resin reactor equipped with a condenser, nitrogen inlet and mechanical stirrer. The reactor is heated to 100° C. In a separate vessel, 200 g butyl acrylate, 100 g methylmethacrylate, and 16 g VAZO-67 are mixed. This monomer mixture is added to the reactor over a 3 hour period. After a 1 hour hold at 100° C., 1 g VAZO-67 dissolved in 2 g xylene is added. The mixture is held at 100° C. for 3 hours, then cooled. The resulting material has a measured solids content of 53.8% (monomer conversion of 89.9 %). Number average molecular weight was 2180 and the weight average molecular weight was 5070 as determined by gel permeation chromatography. The unreacted monomer content determined by gas chromatography was 7.3 %.

Additional solution copolymers are listed in Table 1.

EXAMPLE 2

Preparation of Emulsion Copolymer

Charge water (150 g), a water dispersible polyester (15 g of 30% solids), sodium carbonate (0.3 g), and Aerosol TO75 (1.2 g) to a 1 liter flask. The flask is purged with nitrogen while stirring for at least 10 minutes.

The catalyst solutions are prepared separately: (a) t-butyl hydro peroxide solution (1 g of 90% solution in 40 g water); (b) iso-ascorbic acid solution (0.9 g iso-ascorbic acid in 40 g water); (c) iso-ascorbic acid solution (0.1 g iso-ascorbic acid in 2 g water); (d) ammonium iron (II) sulfate solution (0.1 g in 9 g water).

The monomer pre-emulsion is prepared by mixing the following materials together: water (201 g), butyl acrylate (60 g), vinyl acetate (211.5 g), vinyl ethylene carbonate (24 g), and Aerosol TO75 (1.8 g).

The flask is then charged with 1 g of catalyst solution (c) and 1 g of catalyst solution (d). Catalyst solutions (a), (b), and the pre-emulsion are then simultaneously charged to the flask over 4 hrs, 4 hrs, and 2.5 hours, respectively. A 40% solids latex was then obtained.

EXAMPLE 3

Purification of VEC Solution Copolymer

The unreacted monomers of the example are removed by distillation using a wiped-film vacuum still. Jacket temperature is set at 150° C. and full vacuum is applied. The resin collected is redissolved in xylene. The measured solids of the resin solution is 63%.

EXAMPLE 4

Preparation of Amine Crosslinked Solution Coatings

Portions of the carbonate functional acrylic resin from Example 3 along with additional solvent and either trifunctional amine or difunctional amine were mixed according to the proportions listed in Table 2. Solutions were drawn down using a wire-wrapped drawdown bar onto iron phosphate treated steel panels. Panels were force dried at 80° C. for 45 minutes. Properties were determined after one week of additional curing at ambient conditions and are listed in Table 3.

For comparison, a solution of the carbonate functional acrylic copolymer without any added amine crosslinker was drawn down and subjected to the same curing conditions. The panel had a Konig Pendulum Hardness of 6 sec after force drying and one day of ambient curing.

Additional solution coating properties prepared using carbonate functional acrylic resins are shown in Table IV.

EXAMPLE 5

Crosslinking of Aqueous Emulsion Copolymer

The VEC containing latex of Example 2 was mixed with stoichiometric amounts of ethylene diamine and a difunctional amine functional polyethylene glycol (Jeffamine D-230) and drawn down. MEK rub resistance increased from 5 to 30 and 50 double rubs, respectively after 10 days curing under ambient conditions. Trifunctional amines such as Jeffamine T-403 and tris(2-aminoethyl)amine gelled the latex immediately upon their addition.

TABLE I

COPOLYMERS OF VINYL ETHYLENE CARBONATE

| Monomers | Ratio | Theor. % Solids | Solvent | Polym. Temp (°C.) | Initiator | % Init. | Add. Time (H) | VEC Location | Measur. % Solids | Calcul. % Conv | Mn | Mw |
|---|---|---|---|---|---|---|---|---|---|---|---|---|
| VEC,MMA,BA | 25/50/25 | 60 | Xylene | 80 | AIBN | 2 | 3 | Monomer | 47.3 | 80.2 | 4,830 | 15,200 |
| VEC,MMA,BA | 25/50/25 | 60 | Xylene | 80 | AIBN | 2 | 3 | Reactor | 48.3 | 81.9 | 5,070 | 14,400 |
| VEC,BMA,St | 25/50/25 | 60 | Xylene | 80 | Vazo-67 | 2 | 3 | Reactor | 38.3 | 64.9 | 6,180 | 14,700 |
| VEC,BMA,St | 25/50/25 | 60 | Xylene | 100 | Vazo-67 | 2 | 3 | Reactor | 43.5 | 73.7 | 5,470 | 12,700 |
| VEC,St,BA | 25/50/25 | 60 | Xylene | 100 | Vazo-67 | 2 | 3 | Reactor | 40 | 67.8 | 4,050 | 12,800 |
| VEC,MMA,BA | 25/50/25 | 60 | Xylene | 100 | Vaz,67 | 2 | 3 | Reactor | 50.1 | 83.8 | 3,750 | 9,870 |
| VEC,MMA,BA | 25/50/25 | 60 | Xylene | 120 | Vazo-67 | 2 | 3 | Reactor | 49.7 | 83.1 | 3,000 | 6,780 |
| VEC,BA,MMA | 25/50/25 | 60 | Xylene | 100 | Vazo-67 | 2 | 3 | Reacter | 51.3 | 85.8 | 3,230 | 9,100 |
| VEC,BA,MMA | 25/50/25 | 60 | Xylene | 100 | Vazo-67 | 4 | 3 | Reactor | 52.8 | 88.3 | 2,370 | 5,600 |
| VEC,MMA,BA | 25/50/25 | 60 | Xylene | 100 | Vazo-67 | 2 | 3 | Monomer | 48.3 | 80.8 | 3,920 | 10,100 |
| VEC,BA,MMA | 15/56.5/28.5 | 60 | Xylene | 100 | Vazo-67 | 4 | 3 | Reactor | 56.1 | 93.8 | 2,640 | 6,630 |
| VEC,BA,MMA | 15/56.5/28.5 | 60 | Xylene | 100 | Vazo-67 | 4 | 3 | Monomer | 54.3 | 90.7 | 2,750 | 7,200 |
| VEC,BA,MMA | 25/50/25 | 60 | MAK | 100 | Vazo-67 | 4 | 3 | Reactor | 52 | 87 | 2,000 | 7,050 |
| VEC,BA,MMA | 25/50/25 | 60 | Xylene | 100 | Vazo-67 | 4 | 5 | Reactor | 52.9 | 88.5 | 1,550 | 4,546 |
| VEC,BA | 25/75 | 60 | Xylene | 100 | Vazo-67 | 4 | 3 | Reactor | 55,6 | 93 | 6,800 | 7,990 |
| VEC,BA,MMA | 25/50/25 | 60 | Xylene | 100 | Vazo-67 | 4 | 3 | Reactor | 53.8 | 89.9 | 2,180 | 5,070 |
| VEC,BA,MMA | 25/50/25 | 60 | Xylene | 120 | Vazo-67 | 4 | 5 | Reactor | 54.5 | 91.1 | 6,540 | 7,410 |
| VEC,BA,MMA | 37.5/50/12.5 | 60 | Xylene | 120 | Vazo-67 | 4 | 5 | Reactor | 53.2 | 89 | 1,450 | 2,650 |
| VEC,BA | 50/50 | 60 | Xylene | 100 | Vazo-67 | 4 | 3 | Reactor | 47.2 | 78.9 | 1,230 | 1,800 |
| VEC,BA | 50/50 | 60 | Xylene | 120 | Vazo-67 | 4 | 4 | Reactor | 49 | 81.9 | 1,300 | 2,180 |
| VEC,BA,MMA | 25/50/25 | 60 | Xylene | 100 | L-575 | 4 | 3 | Reactor | 53.1 | 88.5 | | |
| VEC,BA,MMA | 37.5/50/12.5 | 60 | Xylene | 120 | L-575 | 4 | 5 | Reactor | 53.7 | 89.5 | | |
| VEC,BA | 50/50 | 60 | Xylene | 120 | L-575 | 4 | 5 | Reactor | 51.4 | 85.7 | | |

MMA = methylmethacrylate; BA = butyl acrylate; BMA = butyl methacrylate; VA = vinyl acetate; St = Styrene; VEC = vinyl ethylene carbonate; AIBN = azo-bis(isobutyronitrile); VAZO-67 = azo-bis(isovaleronitrile); L-575 = t-amyl-peroxy-2-ethylhexanoate

TABLE II

COATING FORMULATIONS

| Resin Solution | Resin solids | amine/ carbonate | amine | wt amine | solvent | wt solvent |
|---|---|---|---|---|---|---|
| 10 | 6.3 | 1.4 | t(2AH)amine* | 0.63 | MAK | 2 |
| 10 | 6.3 | 1.6 | t(2AH)amine | 0.72 | MAK | 2 |
| 10 | 6.3 | 1.8 | t(2AH)amine | 0.81 | MAK | 2 |
| 10 | 6.3 | 2 | t(2AH)amine | 0.9 | MAK | 2 |
| 10 | 6.3 | 1.4 | t(2AH)amine | 0.63 | BuAc | 2 |
| 10 | 6.3 | 1.8 | t(2AH)amine | 0.81 | BuAc | 2 |

*tris(2-aminoethyl)amine

TABLE III

COATING PROPERTIES AT 1 WEEK

| Formula | KPH - 1 day (secs.) | KPH (secs.) | MEK Drs | Pencil | Rev. Imp. (in.-lbs.) |
|---|---|---|---|---|---|
| A | 23 | 38 | 25 | 5B | <20 |
| B | 24 | 40 | 30 | 5B | <20 |
| C | 26 | 49 | 30 | 4B | <20 |
| D | 27 | 59 | 40 | 3B | <20 |
| E | 26 | 40 | 25 | 5B | <20 |
| F | 31 | 59 | 50 | 3B | 20 |

TABLE IV

Clear Coating Properties

| Sample | Carbonate Eq. Wt. | Cross-linker | Amine/Fn. | Amine/Carbonate | Force Dry + 1 Week ||||| 
|---|---|---|---|---|---|---|---|---|---|
| | | | | | KPH 1 Day | KPH (secs.) | MEK DRubs | Gloss 20/60 | Impact DR |
| A | 378 | T(2-AE)A | 3 | 1.00 | 61 | 61 | 25 | 59/86 | 100/20 |
| B | 378 | T(2-AE)A | 3 | 1.25 | 97 | 97 | 100 | 81/91 | 80/20 |
| C | 274 | T(2-AE)A | 3 | 1.00 | 108 | 125 | 50 | 24/58 | 80/60 |
| D | 274 | T(2-AE)A | 3 | 1.25 | 166 | 147 | 300+ | 61/89 | 120/20 |
| E | 378 | DETA | 2 | 1.00 | 56 | 54 | 300 | 16/40 | 160/140 |
| F | 378 | DETA | 2 | 1.50 | 55 | 41 | 150 | 31/52 | 140/40 |
| G | 274 | DETA | 2 | 1.00 | 118 | 102 | 300+ | 15/37 | 160/160 |
| H | 274 | DETA | 2 | 1.50 | 71 | 61 | 100 | 28/54 | 160/140 |

T(2-AE)A = Tris(2-aminoethyl)amine
DETA = diethylene triamine

We claim:

1. A method for forming a polyurethane coating on a substrate which comprises:

(i) applying to said substrate a coating composition which comprises
  (a) a curable copolymer prepared by the free radical polymerization of from about 1 to 50 weight percent, based on the total weight of monomers, of a monomer compound of formula (I)

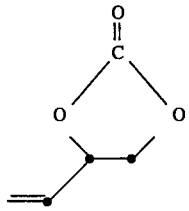

(I)

and one or more monoethylenically unsaturated monomers of a structure other than formula (I), and
  (b) an amino-functional crosslinking agent having at least two amine groups (ii) forming at least a substantially cross-linked polyurethane coating.

2. The method of claim 1, wherein the monoethylenically unsaturated monomers are selected from the group consisting of acrylic acid, methacrylic acid, crotonic acid, methyl methacrylate, ethyl acrylate, butyl acrylate, propyl acrylate, butyl methacrylate, 2-ethyl hexyl acrylate, dimethyl amino ethyl methacrylate, hydroxy ethyl methacrylate, glycidyl methacrylate, acetoacetoxyethyl methacrylate, t-butylaminoethyl methacrylate, dimethylaminoethyl methacrylate, methyl acrylate, methyl methacrylate, ethyl methacrylate, butyl methacrylate, isobutyl acrylate, isobutyl methacrylate, ethylhexyl acrylate, ethylhexyl methacrylate, octyl acrylate, di-n-butyl maleate, divinyl benzene, ethylene glycol diacrylate, ethylene glycol dimethacrylate, trimthylolpropane triacrylate, trimethylolpropane trimethacrylate, hexanediol diacrylate, hexanediol dimethacrylate, and compounds of the formula

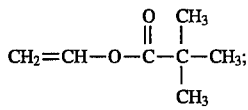

-continued

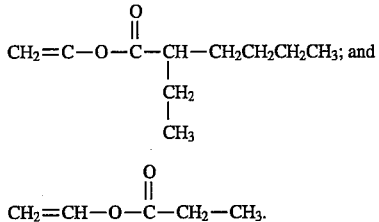

3. A method according to claim 1, wherein the monoethylenically unsaturated monomers are selected from at least acrylates and methacrylates.

4. The method of claim 1, wherein the mono-ethylenically unsaturated monomers are selected from the group consisting of vinyl chloride, vinyl acetate, vinyl proprionate, vinyl 2-ethyl hexanoate, and vinyl pivalate.

5. The method of claim 1, wherein the mono-ethylenically unsaturated monomers are selected from the group consisting of allyl alcohol, allyl chloride, and allyl acetate.

6. The method of claim 1, wherein the mono-ethylenically unsaturated monomers are selected from the group consisting of dimethyl maleate, dimethyl itaconate, acrylonitrile, and acrylamide.

7. The method of claim 1, wherein the curable copolymer (a) is derived from about 1 to about 25 weight percent of vinyl ethylene carbonate, based on the total weight of monomers.

8. The method of claim 7, wherein the mono-ethylenically unsaturated monomers are selected from the group consisting of butyl acrylate, methyl methacrylate, and butyl methacrylate.

9. The method of claim 7, wherein one mono-ethylenically unsaturated monomer is butyl acrylate.

10. The method of claim 1, wherein the amino-functional cross-linking agent has the structure $R(NH_2)_n$, wherein R is a $C_2$–$C_{12}$ hydrocarbyl radical and n is an integer of from 2 to about 6.

11. The method of claim 1, wherein the amino-functional cross-linking agent is selected from the group consisisting of diethylene triamine, ethane-diamine, tris(2-aminoethyl)amine, 4-aminomethyl-1,8-octane diamine, menthane diamine, and primary amine end-capped polyethylene glycol polymers.

12. The method of claim 1, wherein the amino-functional crosslinking agent is 2,4,6-triamine-5-triazine.

13. A method according to claim 1, wherein the monoethylenically unsaturated monomers are selected from at least vinyl acetate, vinyl propionate, vinyl 2-ethyl hexanoate, and vinyl pivalate.

14. A method according to claim 13, wherein the monoethylenically unsaturated monomers are selected from at least vinyl propionate, vinyl 2-ethyl hexanoate, and vinyl pivalate.

15. An article coated with a cured and at least substantially cross-linked composition according to claim 14.

16. A method according to claim 13, wherein said curable copolymer (a) is prepared from at least, a monomer of formula (I) and vinyl acetate.

17. A method according to claim 1, wherein the monoethylenically unsaturated monomers are selected from at least styrene and α-methyl styrene.

18. A method according to claim 1, wherein said curable copolymer (a) is prepared from at least, a monomer of formula (I) and vinyl toluene.

19. A method according to claim 1, wherein said curable copolymer (a) is prepared from at least, a monomer of formula (I) and maleic anhydride.

20. A method according to claim 1, wherein the amino-functional cross-linking agent is selected from at least one of diethylene triamine, tris-(2-aminoethyl)amine and 4-aminomethyl-1,8-octane diamine.

21. A coating composition effective for forming at least a substantially cross-linked polyurethane coating which comprises (a) a curable copolymer prepared by the free radical polymerization of from about 1 to 50 weight percent, based on the total weight of monomers, of a monomer compound of formula (I)

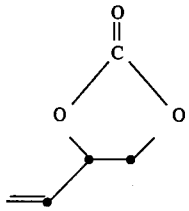
(I)

and one or more monoethylenically unsaturated monomers of a structure other than formula (I), and (b) an amino-functional cross-linking agent having at least two amine groups, with the proviso that said agent is not methylenediamine, ethylenediamine, or hexylenediamine.

22. The composition of claim 21, wherein the monoethylenically unsaturated monomers are selected from the group consisting of acrylic acid, meth-acrylic acid, crotonic acid, methyl methacrylate, ethyl acrylate, butyl acrylate, propyl acrylate, butyl methacrylate, 2-ethyl hexyl acrylate, dimethyl amino ethyl methacrylate, hydroxy ethyl methacrylate, glycidyl methacrylate, acetoacetoxyethyl methacrylate, t-butylaminoethyl methacrylate, dimethylaminoethyl methacrylate, methyl acrylate, methyl methacrylate, ethyl methacrylate, butyl methacrylate, isobutyl acrylate, isobutyl methacrylate, ethylhexyl acrylate, ethylhexyl methacrylate, octyl acrylate, di-n-butyl maleate, divinyl benzene, ethylene glycol diacrylate, ethylene glycol dimethacrylate, trimthylolpropane triacrylate, trimethylolpropane trimethacrylate, hexanediol diacrylate, hexanediol dimethacrylate, and compounds of the formula

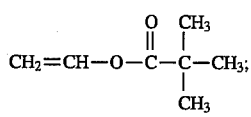

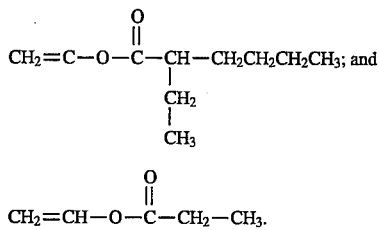

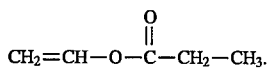

23. An article coated with a cured and at least substantially cross-linked composition according to claim 22.

24. The composition of claim 21, wherein the monoethylenically unsaturated monomers are selected from the group consisting of vinyl chloride, vinyl acetate, vinyl proprionate, vinyl 2-ethyl hexanoate, and vinyl pivalate.

25. The composition of claim 21, wherein the monoethylenically unsaturated monomers are selected from the group consisting of allyl alcohol, allyl chloride, and allyl acetate.

26. The composition of claim 21, wherein the monoethylenically unsaturated monomers are selected from the group consisting of dimethyl maleate, dimethyl itaconate, acrylonitrile, and acrylamide.

27. The composition of claim 21, wherein the curable copolymer (a) is derived from about 1 to about 25 weight percent of vinyl ethylene carbonate, based on the total weight of monomers.

28. The composition of claim 27, wherein the monoethylenically unsaturated monomers are selected from the group consisting of butyl acrylate, methyl methacrylate, and butyl methacrylate.

29. The composition of claim 27, wherein one monoethylenically unsaturated monomer is butyl acrylate.

30. The composition of claim 21, wherein the amino-functional cross-linking agent has the structure $R(NH_2)_n$, wherein R is a $C_2$–$C_{12}$ hydrocarbyl radical and n is an integer of from 2 to about 6.

31. The composition of claim 21, wherein the amino-functional cross-linking agent is selected from the group consisisting of diethylene triamine, ethane-diamine, tris(2-aminoethyl)amine, 4-aminomethyl-1,8-octane diamine, menthane diamine, and primary amine end-capped polyethylene glycol polymers.

32. The composition of claim 21, wherein the amino-functional crosslinking agent is 2,4,6-triamine-5triazine.

33. A shaped or formed article coated with a cured, at least substantially cross-linked composition according to claim 21.

34. A composition according to claim 21, wherein the monoethylenically unsaturated monomers are selected from at least acrylates and methacrylates.

35. An article coated with a cured and at least substantially cross-linked composition according to claim 34.

36. A composition according to claim 21, wherein the monoethylenically unsaturated monomers are selected from at least vinyl acetate, vinyl propionate, vinyl 2-ethyl hexanoate, and vinyl pivalate.

37. A composition according to claim 36, wherein the monoethylenically unsaturated monomers are selected from at least vinyl propionate, vinyl 2-ethyl hexanoate, and vinyl pivalate.

38. A composition according to claim 36, wherein said curable copolymer (a) is prepared from at least, a monomer of formula (I) and vinyl acetate.

39. A composition according to claim 21, wherein the monoethylenically unsaturated monomers are selected from at least styrene and α-methyl styrene.

40. A composition according to claim 21, wherein said curable copolymer (a) is prepared from at least, a monomer of formula (I) and vinyl toluene.

41. A composition according to claim 21, wherein said curable copolymer (a) is prepared from at least, a monomer of formula (I) and maleic anhydride.

42. A composition according to claim 21, wherein the amino-functional cross-linking agent is selected from at least one of diethylene triamine, tris-(2-aminoethyl)amine and 4-aminomethyl-1,8-octane diamine.

* * * * *